US012633823B2

(12) United States Patent
Chinthu et al.

(10) Patent No.: US 12,633,823 B2
(45) **Date of Patent: *May 19, 2026**

(54) MULTI-CHARGE PUMP STRUCTURE WITH RELATED METHOD

(71) Applicant: GlobalFoundries U.S. Inc., Malta, NY (US)

(72) Inventors: Siva Kumar Chinthu, Bangalore (IN); Sundar Veerendranath Palle, Andhra Pradesh (IN); Vivek Saraswat, Bengaluru (IN); Balamurugan Periyasamy, Tamilnadu (IN)

(73) Assignee: GlobalFoundries U.S. Inc., Malta, NY (US)

( * ) Notice: Subject to any disclaimer, the term of this patent is extended or adjusted under 35 U.S.C. 154(b) by 20 days.

This patent is subject to a terminal disclaimer.

(21) Appl. No.: 18/645,509

(22) Filed: Apr. 25, 2024

(65) Prior Publication Data

US 2025/0337321 A1 Oct. 30, 2025

(51) Int. Cl.
*H02M 3/07* (2006.01)

(52) U.S. Cl.
CPC .................................. *H02M 3/073* (2013.01)

(58) Field of Classification Search
None
See application file for complete search history.

(56) References Cited

U.S. PATENT DOCUMENTS

| | | | | |
|---|---|---|---|---|
| 6,922,096 B2 * | 7/2005 | Cernea | ................... | G11C 5/145 |
| | | | | 327/536 |
| 7,072,193 B2 * | 7/2006 | Lin | ........................ | H02M 3/073 |
| | | | | 363/59 |
| 7,098,725 B2 * | 8/2006 | Lee | ........................ | H02M 3/073 |
| | | | | 327/536 |
| 7,602,233 B2 * | 10/2009 | Pietri | .................... | H02M 3/073 |
| | | | | 363/59 |
| 8,049,553 B2 * | 11/2011 | Kim | ........................ | G11C 5/145 |
| | | | | 363/60 |
| 8,339,183 B2 | 12/2012 | Htoo et al. | | |
| 9,219,427 B2 * | 12/2015 | Aebischer | .............. | H02H 9/046 |
| 9,787,176 B2 * | 10/2017 | Dong | ....................... | H02M 3/07 |
| 10,097,086 B2 | 10/2018 | Achter et al. | | |

(Continued)

OTHER PUBLICATIONS

Kim et al., "A 0.15 V Input Energy Harvesting Charge Pump With Dynamic Body Biasing and Adaptive Dead-Time for Efficiency Improvement," IEEE Journal of Solid-State Circuits, vol. 50, No. 2, Feb. 2015, pp. 414-425.

(Continued)

*Primary Examiner* — Thomas J. Hiltunen
(74) *Attorney, Agent, or Firm* — David Cain; Hoffman Warnick LLC

(57) ABSTRACT

The present disclosure relates to structures including charge pump structures and related methods of operating such structures. A structure of the disclosure includes a first charge pump stage including first branches each connected between an input voltage and ground. The first branches each include first capacitors (C1, C2) connected between first intermediate nodes (Q1, Q1_B) and additional first intermediate nodes (V1, V1_B), respectively. A second charge pump stage includes second branches each connected between second intermediate nodes and additional second intermediate nodes, respectively.

18 Claims, 7 Drawing Sheets

(56) References Cited

U.S. PATENT DOCUMENTS

| 10,447,153 | B2 * | 10/2019 | Raimar | ................... | H02M 3/07 |
|---|---|---|---|---|---|
| 11,139,004 | B2 * | 10/2021 | Sinha | ...................... | H02M 3/07 |
| 11,569,738 | B1 | 1/2023 | Chinthu | | |
| 2010/0019831 | A1 * | 1/2010 | Han | ........................ | H02M 3/07 |
| | | | | | 327/536 |
| 2010/0327959 | A1 | 12/2010 | Lee | | |

OTHER PUBLICATIONS

Pelliconi et al., "Power Efficient Charge Pump in Deep Submicron Standard CMOS Technology," IEEE Journal of Solid-State Circuits, vol. 38, No. 6, Jun. 2003, pp. 1068-1071.
Wang et al., "A High-Efficiency Split-Merge Charge Pump for Solar Energy Harvesting," IEEE Transactions on Circuits and Systems—II: Express Briefs, vol. 64, No. 5, May 2017, pp. 545-549.
Zhai et al., "A Design of fast-setting on-chip Charge Pump Circuit," International Conference on Smart Transportation, Energy and Power (STEP 2021), Journal of Physics: Conference Series, 8 pages.

* cited by examiner

MULTI-CHARGE PUMP STRUCTURE WITH RELATED METHOD

BACKGROUND

The present disclosure relates to structures including charge pump structures and related methods.

A charge pump circuit is a circuit that converts a direct current (DC) power source (i.e., an input voltage (Vin)) to a larger DC power source (e.g., to an output voltage (Vout) that is greater than Vin). A charge pump circuit with a single stage can convert a Vin that is equal to a positive supply voltage (VDD) to a Vout that is approximately 2*VDD or somewhat less when an electrical load is connected to the output to drive current. For example, if Vin is 1.8V, then Vout could be approximately 3.6V or reduced to, for example, 3.0V due to a resistive load connected to the output. Many charge pump circuits may include additional capacitors and/or other non-capacitor elements to further control the relationship between input and output voltages. Compared to transistors, capacitors and other circuit elements may occupy high amounts of surface area in a device. In some cases, these additional capacitors and/or other components may impede compliance with surface area requirements.

SUMMARY

Aspects of the disclosure provide a structure including a first charge pump stage including first branches each connected between an input voltage and ground, wherein the first branches each include first capacitors (C1, C2) connected between first intermediate nodes (Q1, Q1_B) and additional first intermediate nodes (V1, V1_B), respectively; and a second charge pump stage including second branches each connected between second intermediate nodes and additional second intermediate nodes, respectively.

Further aspects of the disclosure provide a structure including a first charge pump stage including first branches each connected between an input voltage and ground, wherein the first branches each include first capacitors (C1, C2) connected between first intermediate nodes (Q1, Q1_B) and additional first intermediate nodes (V1, V1_B), respectively, and wherein the first charge pump stage further includes: two first p-channel field effect transistors connected in series between the additional first intermediate nodes (V1, V1_B), wherein the first p-channel field effect transistors are controlled by a clock signal and an inverted clock signal, respectively, and two additional first p-channel field effect transistors connected in series between the first intermediate nodes (Q1, Q1_B) and cross coupled to each other; an additional first capacitor (C3) connected between the input voltage node and a first output voltage node at a junction between the additional first p-channel field effect transistors; and a second charge pump stage including second branches, wherein the second branches each include second capacitors (C4, C5) connected between second intermediate nodes (Q2, Q2_B) and additional second intermediate nodes (V2, V2_B), respectively.

Additional aspects of the disclosure provide a method including: applying an input voltage to a first charge pump stage including first branches each connected between an input terminal and ground, wherein the first branches each include first capacitors (C1, C2) connected between first intermediate nodes (Q1, Q1_B) and additional first intermediate nodes (V1, V1_B), respectively; and outputting a voltage from the first charge pump stage to a second charge pump stage including second branches each connected between second intermediate nodes (Q2, Q2_B) and additional second intermediate nodes (V2, V2_B), respectively.

It should be noted that all aspects, examples, and features of disclosed embodiments mentioned in the summary above can be combined in any technically possible way. That is, two or more aspects of any of the disclosed embodiments, including those described in this summary section, may be combined to form implementations not specifically described herein. The details of one or more implementations are set forth in the accompanying drawings and the description below. Other features, objects and advantages will be apparent from the description and drawings, and from the claims.

BRIEF DESCRIPTION OF THE DRAWINGS

The present disclosure will be better understood from the following detailed description with reference to the drawings, which are not necessarily drawn to scale and in which.

DETAILED DESCRIPTION

Figure 1:
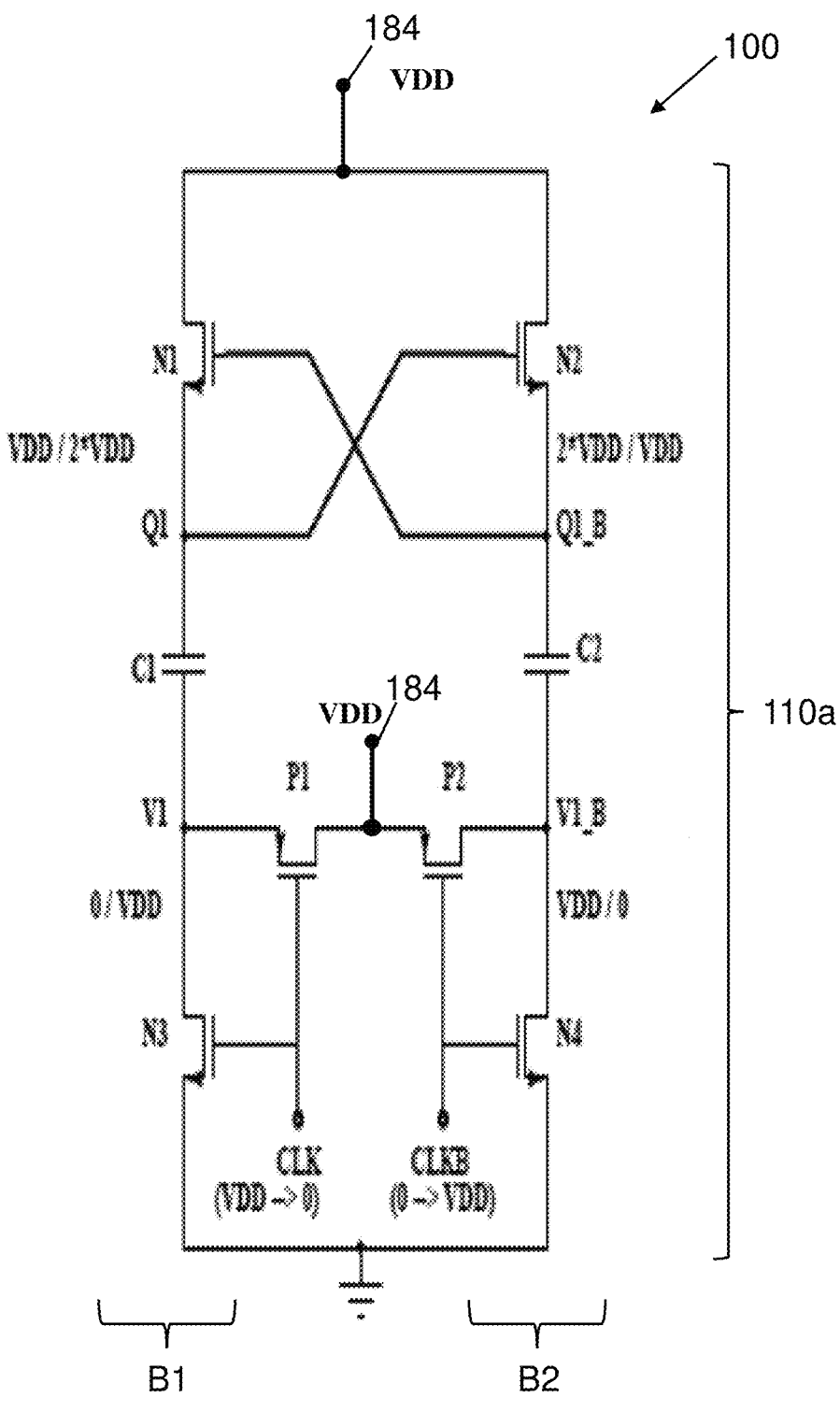
FIG. 1 is a schematic diagram of part of a first charge pump stage according to embodiments of the disclosure.

A charge pump circuit is a circuit that converts a direct current (DC) power source (i.e., an input voltage (Vin)) to a larger DC power source (e.g., to an output voltage (Vout) that is greater than Vin). A charge pump circuit with a single stage can convert a Vin that is equal to a positive supply voltage (VDD) to a Vout that is approximately 2*VDD or somewhat less when an electrical load is connected to the output to drive current. For example, if Vin is 1.8V, then Vout could be approximately 3.6V or reduced to, for example, 3.0V due to a resistive load connected to the output. Many charge pump circuits may include additional capacitors and/or other non-capacitor elements to further control the relationship between input and output voltages. Compared to transistors, capacitors and other circuit elements may occupy high amounts of surface area in a device. In some cases, these additional capacitors and/or other components may impede compliance with surface area requirements.

In view of the foregoing, disclosed herein are embodiments of a charge pump circuit including a first charge pump stage including first branches each connected between an input voltage and ground. The first branches each include first capacitors (C1, C2) connected between first intermediate nodes (Q1, Q1_B) and additional first intermediate nodes (V1, V1_B), respectively. A second charge pump stage includes second branches connected between a set of first intermediate nodes a set of additional second intermediate nodes, respectively. Charge pump operation is controlled by a combination of both a clock signal (CLK) and an inverted clock signal (CLKB). In this configuration, a supply voltage (VDD) can be coupled to a load capacitor through the two charge pump stages such that one capacitor in the first stage and one capacitor in the second stage are coupled in series between the supply voltage and load capacitor. Simultaneously, the other two capacitors in each stage are connected in parallel between the supply voltage and ground. Switching of CLK and CLKB will switch which of the two capacitors are coupled in series or in parallel. Among other advantages, embodiments of the disclosure allow a charge pump to produce higher direct current (DC) voltage outputs with fewer transistors and/or other components for directing current from the supply voltage to a load capacitor. In turn, these benefits cause the charge pump to occupy less surface area than would be needed for a conventional charge pump structure.

More particularly, referring generally to FIGS. 1-4, disclosed herein are embodiments of a structure and, particularly, of a charge pump structure 100 (hereinafter referred to as structure 100) including a supply voltage node 184 (also referred to herein as an input node) (see FIG. 1 and FIG. 3), an output node 185 (FIG. 4 only), two charge pump (CP) stages (110a, 110b) (simply "stage" or "stages" hereafter) connected between input node 184 and output node 185. A discussed herein, some capacitors in each stage 110a, 110b may be coupled in series between nodes 184, 185 whereas others may be coupled in parallel. Whether certain capacitors in each stage 110a, 110b are connected in series or parallel may vary based on the state of transistors as controlled via a combination of both a clock signal (CLK) and an inverted clock signal (CLKB) to structure 100. As discussed herein, at least one capacitor in each stage 110a, 110b will be connected to one capacitor in another stage 110a, 110b in series and at least one capacitor in each stage 110a, 110b will be coupled to ground in a parallel configuration regardless of whether a clock signal to structure 100 is high such that the inverted clock signal is low or low such that the clock signal is high. The logic level of the clock signal instead controls which of the capacitors in each stage 110a, 110b are in which of the two configurations.

Structure 100 can further include a capacitive load ($C_O$) 183 (FIG. 4), which is electrically connected to an output node 185 (e.g., between the output node 185 and ground). Optionally, any other type of DC-operated electronic load (e.g., a resistive load and/or any other type of voltage-drive DC device) may be coupled to output node 185.

The total number of stages 110 in structure 100 can be any number to provide a multi-stage charge pump, but two stages 110a (FIGS. 1, 2 only), 110b (FIGS. 3, 4 only) are shown and discussed herein as an example. First stage 110 (a) can include two first branches B1, B2 (FIG. 1) each including a respective first capacitor C1, C2. Each branch B1, B2 is coupled to one of two first intermediate nodes Q1, Q1_B through one of the first capacitors C1, C2. Each first branch B1, B2 moreover includes an N-channel field effect transistor (NFET) N1, N2 coupled from drain to source between input voltage node 184 and one of the first capacitors C1, C2. NFETs N1, N2 in each branch may be cross-coupled at their gate terminal to the intermediate node of another branch, i.e., NFET N1 in branch B1 is coupled at its gate to intermediate node Q1_B in branch B2 and NFET N2 in branch B2 is coupled at its gate to intermediate node Q1 in branch B1.

Each branch B1, B2 further includes an additional first intermediate node at the opposite terminal of its respective first capacitor C1, C2. Thus, first capacitor C1 in branch B1 is between first intermediate node Q1 and an additional first intermediate node V1 and second capacitor C2 in branch B2 is between first intermediate node Q1_B and an additional first intermediate node V1_B.

Each first branch B1, B2 also includes additional first NFETs N3, N4 coupled from drain to source between one additional first intermediate node V1, V1_B and ground. In first branch B1, NFET N3 couples additional intermediate node V1 to ground. In first branch B2, NFET N4 couples additional intermediate node V1_B to ground. Unlike NFETs N1, N2 (which are cross-coupled), NFET N3 in branch B1 and NFET N4 in branch B2 are coupled at their respective gates to different terminals for receiving different control signals, respectively. Specifically, the gate of NFET N3 is connected to receive a clock signal (CLK) and the gate of NFET N4 is connected to receive an inverted clock signal (CLKB) that is inverted with respect to CLK. Specifically, CLK can switch back and forth between a positive supply voltage (VDD) to ground (GND) (e.g. at 0.0V). Furthermore, when CLK switches from VDD to GND, CLKB will switch from GND to VDD and vice versa.

Each additional intermediate node V1, V1_B may be coupled to supply voltage VDD through the source-drain pathway of one P-channel field effect transistor (PFET). For instance, additional intermediate node V1 may be selectively coupled to supply voltage VDD through PFET P1, and additional intermediate node V1_B may be selectively coupled supply voltage VDD through PFET P2. Supply voltage VDD can further be connected to supply voltage node 184. PFETs P1, P2 are also coupled at their gates to clock input CLK and inverted clock input CLKB, respectively. Each pair of FETs P1, N4 or FETs P2, N3 will be turned on at opposite logic levels, i.e., gate voltages at or above a threshold level will allow source-drain currents to pass through NFETS N3 and N4 and gate voltages exceeding VDD by a threshold level will prevent source-drain currents from passing through PFETS P1 and P2. Conversely, gate voltages below the threshold level will prevent source-drain currents from passing through NFETs N3, N4 and gate voltages below the threshold voltage and above VDD will allow source-drain currents to pass through PFETs P1, P2.

In this configuration, the states of CLK and CLKB in combination will control the on/off states of P1, P2, N3 and N4 to cause input voltage node 184 to couple one capacitor to ground through one first branch, and to connect input voltage node 184 to second stage 110b through the capacitor in the other first branch. For instance, when CLK is at VDD and CLKB is at GND, NFET N3 turns on and PFET P1 turns off. Thus, in B1, V1 is pulled to ground and Q1 will be at VDD. Simultaneously, NFET N4 will turn off and PFET P2 will turn on. So, in B2, V1_B is pulled up to VDD through P2 and Q1_B switches to 2*VDD. When Q1_B is at 2*VDD N1 turns on, so Q1 is maintained at VDD, thereby keeping N2 in an off state. As a result, capacitor C1 in first branch B1 has one plate electrically connected to input voltage node 184 via N1 (which is turned on) and another plate connected to ground via N3 (which is also turned on). On the other hand, capacitor C2 in B2 has one plate connected input voltage node 184 via P2 (which is turned on) and another plate connected to Q1_B at 2*VDD.

When CLK switches to GND and CLKB switches to VDD, NFET N4 turns on and PFET P2 turns off. Thus, in branch B2, V1_B is pulled to ground and Q1_B is coupled to VDD. Simultaneously, NFET N3 will turn off and PFET P1 will turn on. In branch B1, V1 is pulled up to VDD through P1 and Q1 switches to 2*VDD. When Q1 is at 2*VDD N2 turns on, so Q1_B is maintained at VDD, thereby keeping N1 in an off state. As a result, capacitor C2 in B2 has one plate electrically connected to input voltage node 184 via N2 (which is turned on) and another plate connected to ground via N4 (which is also turned on). On the other hand, capacitor C1 in branch B1 has one plate connected input voltage node 184 via P1 (which is turned on) and another plate connected to Q1 at 2*VDD.

Figure 2:
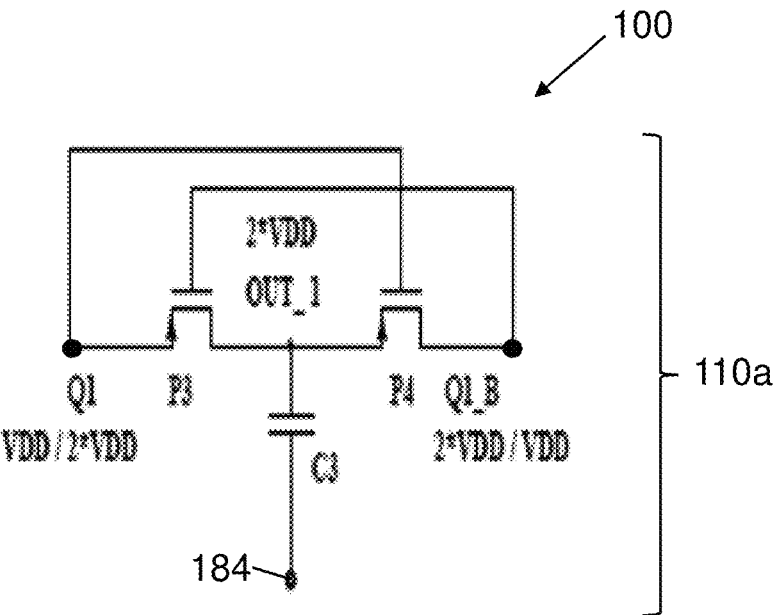
FIG. 2 is a schematic diagram of another part of the first charge pump stage according to embodiments of the disclosure.
Figure 3:
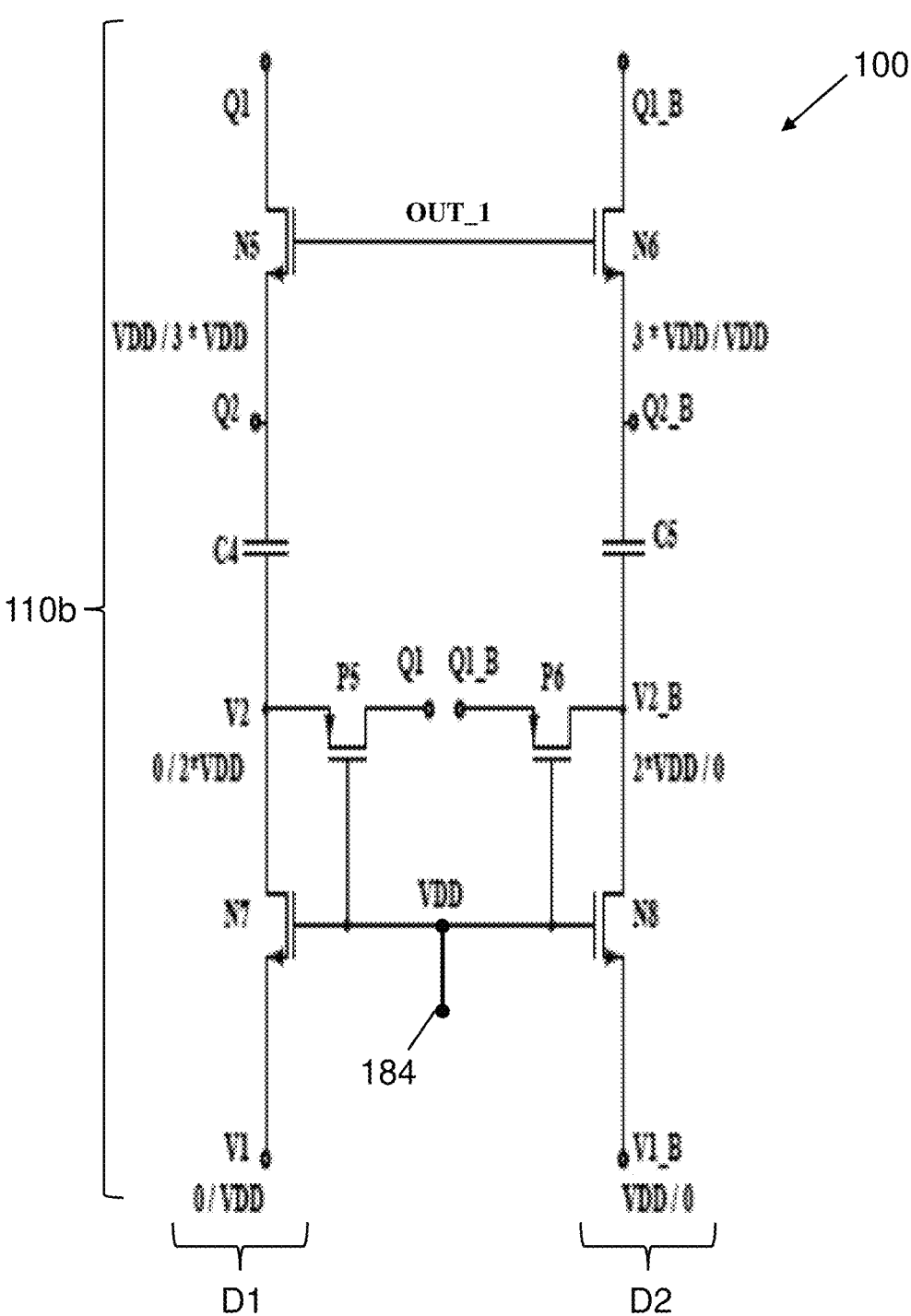
FIG. 3 is a schematic diagram of part of a second charge pump stage according to embodiments of the disclosure.

Referring briefly to FIG. 2, supply voltage VDD can couple either of the additional intermediate nodes V1, V1_B to a corresponding second stage input node Q1, Q1_B of second stage 110b (FIG. 3). As shown, supply voltage VDD is coupled to the source or drain of third and fourth PFETs P3, P4 through a series-coupled capacitor C3. Each second stage input node Q1, Q1_B can be coupled to the gate and the source or drain of its respective PFET P3, P4 such that supply voltage VDD is coupled to only one second stage input node Q1, Q1_B at a time. Due to the presence of multiple capacitors between input voltage node 184 (FIG. 1) and second stage input nodes Q1, Q1_B, the voltage DC voltage at each second stage input node Q1, Q1_B also defines a first output voltage node OUT_1, which may be approximately twice the voltage at input voltage node 184 (i.e., 2*VDD as shown). Thus, the arrangement of NFETs N1, N2, N3, N4 and PFETs P1, P2, P3, P4 will alternately couple one first capacitor C1 or C2 between supply voltage VDD and ground while coupling the other first capacitor C1 or C2 to the corresponding second input node Q1, Q1_B. Capacitor C3 is coupled between input voltage node 184 and first output voltage node OUT_1 in parallel with first branches B1, B2 to compensate for any losses across transistors in each branch. Capacitor C3 may be significantly smaller than capacitors C1, C2 and thus does not interfere with the voltage amplifying functions in each first branch B1, B2. First stage 110a will output the same magnitude DC voltage (2*VDD) regardless of which branch B1, B2 is coupled to second stage 110b, and thus maintains a steady DC voltage at the desired level.

Figure 4:
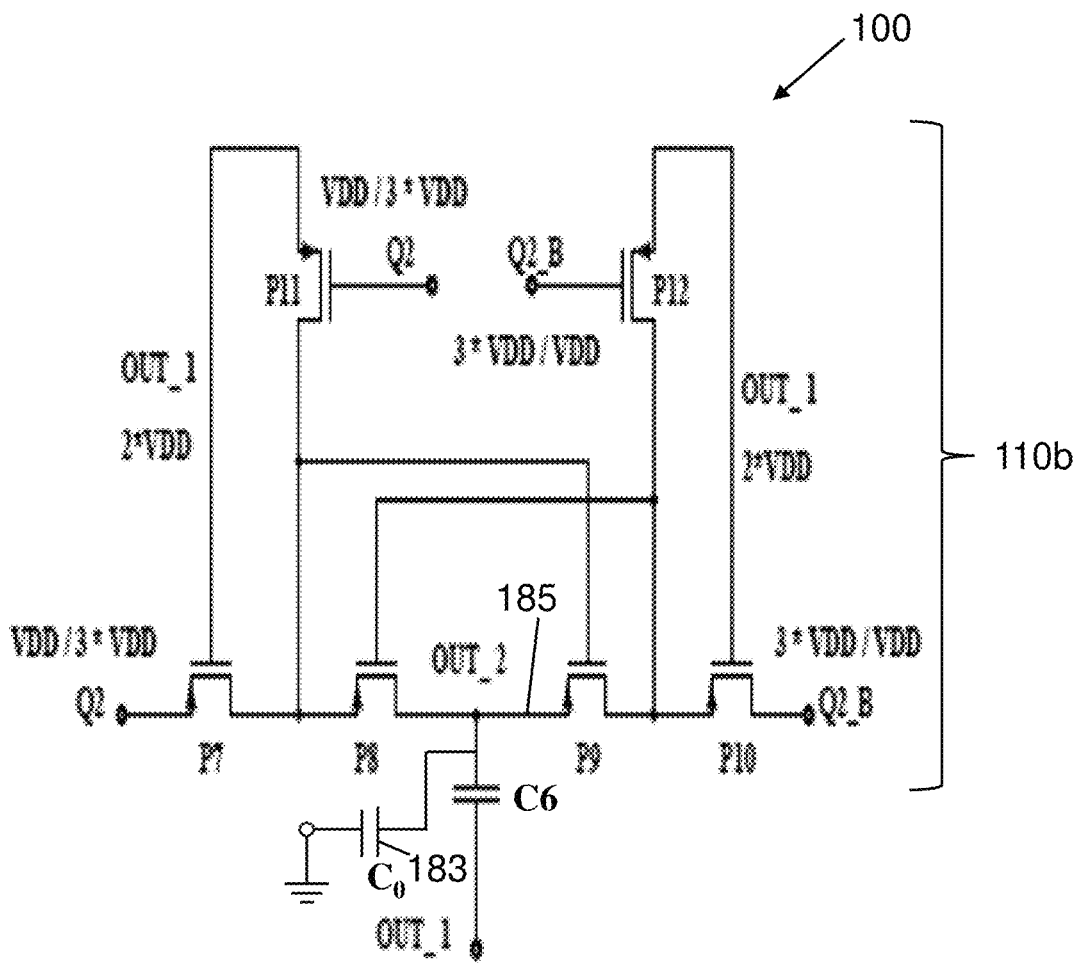
FIG. 4 is a schematic diagram of another part of the second charge pump stage according to embodiments of the disclosure.

Turning now to FIGS. 3 and 4, structure 100 includes second charge pump stage 110b including second branches D1, D2 (FIG. 3) each coupling a respective second input node Q1, Q1_B to a corresponding second intermediate node Q2, Q2_B, which in turn are coupled to a second output node OUT_2 (FIG. 4 only) indicating the output from second stage 110b. In the case of a two stage charge pump, second output node OUT_2 provides the DC output node for the charge pump. As discussed elsewhere herein, second stage 110b is shown as being coupled to load capacitor $C_O$ (FIG. 4 only) at second output node OUT_2, but other types of loads (e.g., resistive loads, resistor-capacitor loads, etc.) may be coupled to second output node OUT_2 in place of load capacitor $C_O$ as discussed previously herein.

Referring specifically to FIG. 3, second branches D1, D2 of second stage 110b are similar to first branches B1, B2 (FIG. 1) of first stage 110a but do not include cross-coupled NFETs therein. Instead, second input nodes Q1, Q1_B are coupled to second intermediate nodes Q2, Q2_B through the source-to-drain pathway of a respective NFET N5, N6. NFETs N5, N6 additionally are coupled at their gates to first output voltage node OUT_1, thereby coupling input nodes Q1, Q1_B to second intermediate nodes Q2, Q2_B only when structure 100 and stages 110a, 110b are electrically active. As shown, second input nodes Q1, Q1_B are coupled to second branches D1, D2 of second stage 110b at multiple locations: they are also each tied to one source/drain terminal of a respective PFET P5, P6 elsewhere in second stage 110b. Moreover, PFETs P5, P6 each have a gate coupled to supply voltage VDD and the gate of a respective NFET N7, N8 in one of second branches D1, D2. Each branch D1, D2 includes an additional second intermediate node V2, V2_B.

Each additional second intermediate node V2, V2_B is coupled to a respective second input node Q1, Q1_B through the other source/drain terminal of its corresponding PFET P5, P6. Each additional second intermediate node V2, V2_B is also coupled to one of the additional intermediate nodes V1, V1_B of first stage 110a (FIG. 1) through the source-drain pathways of a respective NFET N7, N8. As shown in the diagram, additional intermediate nodes V1, V1_B may be set to pulsed logic levels, e.g., VDD during a clock signal or zero during an inverted clock signal. The alternating logic levels will cause additional intermediate nodes V1, V1_B to alternately have the voltage output from first stage 110a (e.g., 2*VDD) or a zero voltage, such that a clock signal will cause one of nodes V1, V1_B to have the output voltage from first stage 110a while the other node V1, V1_B will have a zero voltage.

Second stage 110b includes two capacitors C4, C5 each coupled between second one of second intermediate nodes Q2, Q2_B and one of additional second intermediate nodes V2, V2_B. By this configuration, each clock signal or inverted clock signal will electrically couple one capacitor C4, C5 in second stage 110b from supply voltage VDD to ground ("0") and simultaneously couple the other capacitor C4, C5 to capacitor C3 and one of capacitors C1, C2 of first stage 110a. When each capacitor C4, C5 is coupled in series to capacitor(s) C1, C2, of first stage 110a, charge will accumulate therein and raise the voltage of its corresponding second intermediate node to a higher level, e.g., 3*VDD as shown. In this configuration, second stage 110b, similarly to first stage 110a, will output the same magnitude DC voltage (3*VDD) at second output node OUT_2 regardless of which branch D1, D2 is coupled to first stage 110a and thus maintains a stead DC voltage at the desired level.

FIG. 4 depicts another portion of second stage for connecting second intermediate nodes Q2, Q2_B to second output node OUT_2 to provide a higher voltage DC output from structure 100. FIG. 4 is configured to be structurally and operationally similar to the portions of first stage 110a shown in FIG. 2, but with the addition of PFETS P7, P10, P11, P12 for amplifying the output from first stage 110a to second stage 110b via gate to source or gate to drain couplings. Second intermediate nodes Q2, Q2_B each may be connected to two other locations in second stage 110b: each may be connected to the gate of a respective PFET P11, P12, and the source/drain terminal of another PFET P7, P10. PFETs P7, P10 each may be one of a pair of PFETs each coupling one second intermediate node Q2, Q2_B to second output node OUT_2. PFETs P7, P8 couple second intermediate node Q2 to second output node OUT_2 through their source and drain terminals. PFETs P9, P10 similarly couple another second intermediate node Q2_B to second output node OUT_2 through their source and drain terminals.

PFETs P7, P10 also may be coupled at their gates to the first output voltage node OUT_1 such that they have the first output voltage (e.g., 2*VDD) applied thereto. The gate of each PFET P7, P10 is also coupled to the source or drain of one PFET P11, P12. The other source or drain of each PFET P11, P12 is connected between source and drain terminals of one pair of PFETs, P7 and P8 or P9 and P10, respectively. The same node (i.e., the other source or drain of PFETs P11, P12) is also coupled to the gate of one PFET in the pair, e.g., the gate of PFET P8 or the gate of PFET P9. In this configuration, second intermediate nodes Q2, Q2_B are alternately coupled to second output terminal OUT_2 for one type of logic level to second stage 110b (e.g., a clock signal or inverted clock signal), but will be decoupled from second output terminal OUT_2 for the opposite logic level. Thus, some capacitors C1, C2, C3, C4, C5 will be connected in series from supply voltage VDD to output node 185 in response to a clock signal or inverted clock signal, whereas others will be coupled from supply voltage VDD to ground ("0") in parallel in response to the opposite type of clock signal. In either case, OUT_2 will remain steady at a predetermined DC voltage level (e.g., 3*VDD) and thus will provide a fixed output voltage at output node 185.

In addition, a sixth capacitor C6 may be coupled between output nodes OUT_1, OUT_2 to compensate for any losses incurred across the transistors in second stage 110a, e.g., thus serving a similar function to sixth capacitor C3 discussed herein. The capacitance of capacitors C3, C6 may be substantially less than that of other capacitors C1, C2, C4, C5 of structure 100 to prevent any reduction in the DC voltage increase from first stage 110a to second stage 110b while compensating for losses across the transistors. According to an example, capacitors C1, C2, C4, C5 may have a capacitance of approximately 8.0 picofarads (pF). In this case, capacitors C3, C6 may have a capacitance of approximately 0.20 picofarads (pF), e.g., approximately 2.5% of the capacitance of other capacitors in structure 100 or a similar magnitude. All capacitors C1, C2, C3, C4, C5, C6 nonetheless may have significantly less capacitance than load capacitor $C_0$ of capacitive load 183 coupled thereto, where applicable.

Figure 5:
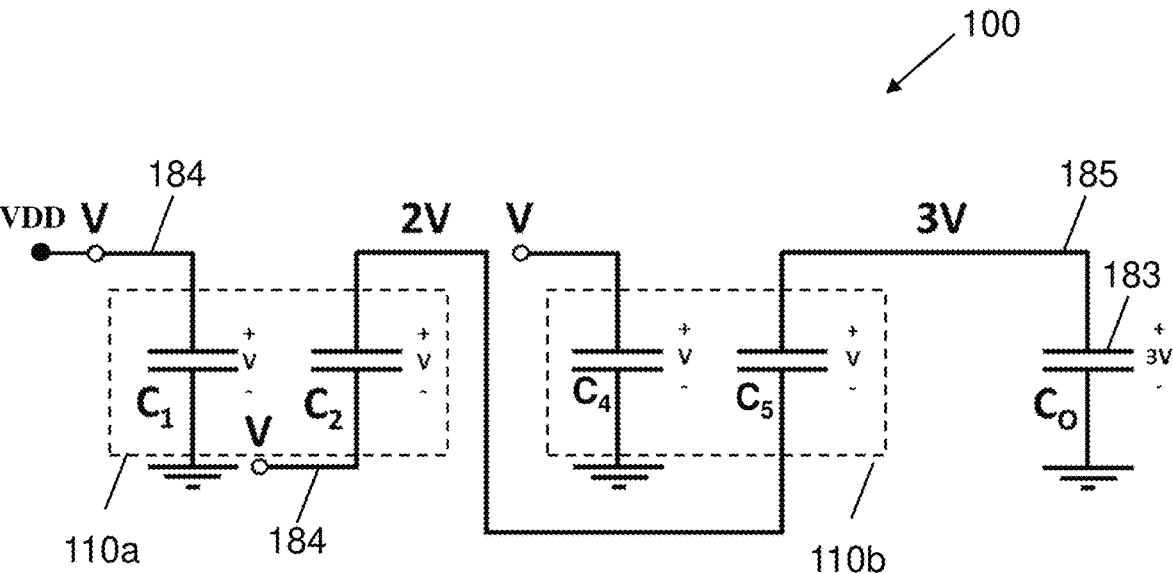
FIG. 5 is a simplified schematic diagram of the disclosed charge pump illustrating series-connections of capacitors between an input voltage node at VDD and a capacitive load through the first and second charge pump stages in response to clock and inverted clock signals at VDD and 0.0V, respectively.
Figure 6:
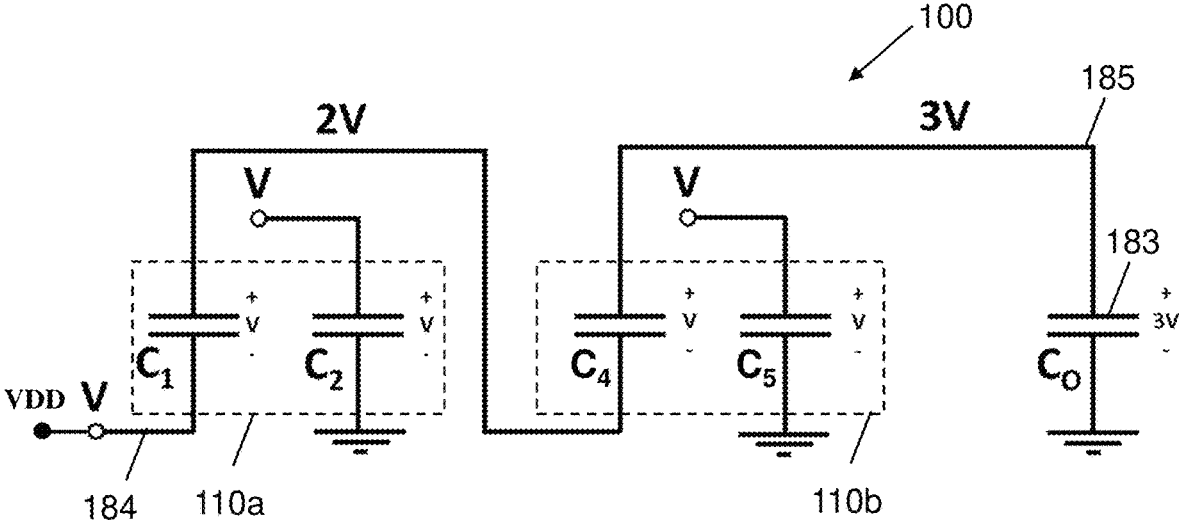
FIG. 6 is a simplified schematic diagram of the disclosed charge pump illustrating series-connections of capacitors between the input voltage node and a capacitive load through the first and second charge pump stages in response to clock and inverted clock signals at 0.0V and VDD, respectively.
Figure 7:
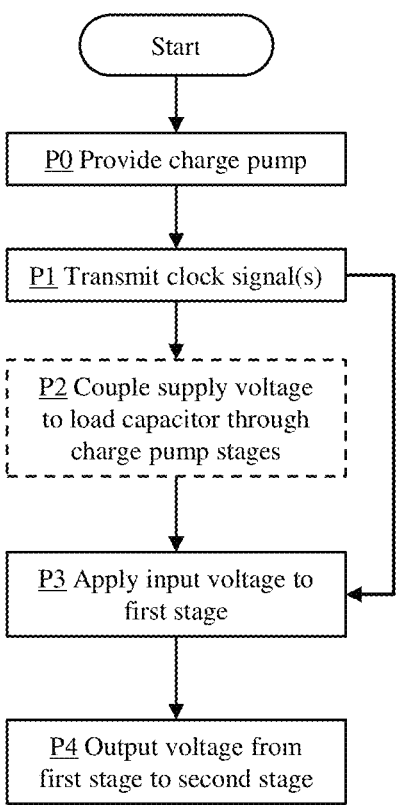
FIG. 7 is a flow diagram indicating an example method for operating a structure with two charge pump stages according to embodiments of the disclosure.

Referring now to FIGS. 5 and 6, a simplified schematic of structure 100 and stages 110a, 110b thereof is shown during a clock signal (FIG. 5) and inverted clock signal (FIG. 6) to further illustrate operational details of structure 100. Capacitors C3 (FIG. 2) and C6 (FIG. 4) are omitted solely for clarity of explanation, as only capacitors C1, C2, C4, C5 are for accumulating charge and increasing voltage levels during operation. Structure 100 provides the function of a charge pump between input voltage node 184 and output node 185 by alternating whether certain capacitors C1, C2, C4, C5 are coupled in series between nodes 184, 185 or connected in parallel between supply voltage VDD and ground. During a clock signal the various transistors of each stage 110a, 110b will cause capacitors C2, C5 to be connected in series between input voltage node 184 (set to VDD via node "V") and output node 185. Simultaneously, the transistors of each stage 110a, 110b will cause capacitors C1, C4 to be connected in parallel between VDD and ground. Thus, supply voltage VDD will charge capacitors C1, C4 because they do not have capacitive load 183 and/or any other electrical load coupled thereto. Simultaneously, capacitors C2, C5 will discharge as a result of being coupled to capacitive load 183 and/or other electrical loads through output node 185. The discharging of capacitors C2, C5 may be substantially slower than the charging of capacitors C1, C4 due to the serial capacitive coupling between nodes 184, 185.

As depicted in FIG. 6, an inverted clock signal will cause the transistors in each stage 110a, 110b of structure 100 to provide opposite configurations for each capacitor C1, C2, C4, C5. Here, capacitors C2, C5 are coupled in parallel between VDD (via nodes "V") and ground and thus undergo charging as a result of the inverted clock signal. Capacitors C1, C4 are now coupled in series between input voltage node 184 and output node 185, and thus undergo discharging to capacitive load 183 and/or other electrical loads coupled to output node 185. However, the output voltage at output node 185 remains at a constant DC voltage (e.g., 3V to indicate 3*VDD as shown) regardless of which capacitors C1, C2, C4, C5 are discharging (connected in series) or discharging (connected in parallel). Thus, capacitors C1, C2, C4, C5 can be charged at high efficiency while maintaining the desired voltage at output node 185, and without relying a significant number of additional capacitors. In turn, structure 100 requires less surface area than other structures 100 serving the same or similar functions. It is also understood that additional stages can be added to structure 100 as desired by replicating the structure of stages 110a, 110b to provide additional pairs of capacitors. One capacitor of each pair can be added to the series coupling for discharge or parallel coupling to ground for discharge based on clock signals and inverted clock signals delivered to structure 100.

Turning to FIGS. 1-4 and FIG. 7, further embodiments of the disclosure provide methods to operate structure 100. Process P0 may include providing (e.g., by manufacturing, assembling, and/or otherwise receiving) a charge pump within structure 100 including first stage 110a, second stage 110b, and/or any desired additional stages therein. Structure 100 may couple input voltage node 184 to output node 185, and any capacitive load(s) 183 coupled to output node 185. In some implementations, process P0 may be implemented by one or more outside parties, in which case the methodology may begin at process P1 discussed herein.

Process P1 includes transmitting clock signals and inverted clock signals (i.e., alternating logic levels at a predetermined frequency) to structure 100. As discussed herein, the transmitted clock signals will alternately couple pairs of capacitors (C1 and C4, or C2 and C5) in series between nodes 184, 185 or in parallel between input voltage node 184 and ground. If not previously implemented, methods of the disclosure may include process P2 of coupling a supply voltage (VDD) to input voltage node 184 and load capacitor $C_0$ to output node 185. In some implementations, process P2 may be included within and/or implemented as part of process P0, or may occur independently of methods described herein. In any case, further operation of structure 100 may include transmitting supply voltage VDD to input voltage node 184 and outputting a DV voltage from output node 185 to load capacitor $C_0$ and/or any other electrical load elements. Methods of the disclosure further may include applying an input voltage (e.g., VDD at a particular magnitude) to first stage 110a. Thereafter, methods of the disclosure include process P4 of outputting a voltage (e.g., 2*VDD) from first stage 110a to second stage 110b, via first branches B1, B2 (FIG. 1) and second branches D1, D2 (FIG. 3). The implementing of process P4 will cause a desired DC output voltage (e.g., 3*VDD) to be transmitted from output node 185 to any electrical load(s) coupled thereto.

In the method and structures described above, a semiconductor material refers to a material whose conducting properties can be altered by doping with an impurity. Exemplary semiconductor materials include, for example, silicon-based semiconductor materials (e.g., silicon, silicon germanium, silicon germanium carbide, silicon carbide, etc.) and III-V compound semiconductors (i.e., compounds obtained by combining group III elements, such as aluminum (Al), gallium (Ga), or indium (In), with group V elements, such as nitrogen (N), phosphorous (P), arsenic (As) or antimony (Sb)) (e.g., GaN, InP, GaAs, or GaP). A pure semiconductor material and, more particularly, a semiconductor material that is not doped with an impurity for the purposes of increasing conductivity (i.e., an undoped semiconductor material) is referred to in the art as an intrinsic semiconductor. A semiconductor material that is doped with an impurity for the purposes of increasing conductivity (i.e., a doped semiconductor material) is referred to in the art as an extrinsic semiconductor and will be more conductive than an intrinsic semiconductor made of the same base material. That is, extrinsic silicon will be more conductive than intrinsic silicon; extrinsic silicon germanium will be more conductive than intrinsic silicon germanium; and so on. Furthermore, it should be understood that different impurities (i.e., different dopants) can be used to achieve different conductivity types (e.g., P-type conductivity and N-type conductivity) and that the dopants may vary depending upon the different semiconductor materials used. For example, a silicon-based semiconductor material (e.g., silicon, silicon germanium, etc.) is typically doped with a Group III dopant, such as boron (B) or indium (In), to achieve P-type conductivity, whereas a silicon-based semiconductor material is typically doped with a Group V dopant, such as arsenic (As), phosphorous (P) or antimony (Sb), to achieve N-type conductivity. A gallium nitride (GaN)-based semiconductor material is typically doped with magnesium (Mg) to achieve P-type conductivity and with silicon (Si) or oxygen to achieve N-type conductivity. Those skilled in the art will also recognize that different conductivity levels will depend upon the relative concentration levels of the dopant(s) in a given semiconductor region.

It should be understood that the terminology used herein is for the purpose of describing the disclosed structures and methods and is not intended to be limiting. For example, as used herein, the singular forms "a," "an," and "the" are intended to include the plural forms as well, unless the context clearly indicates otherwise. Additionally, as used herein, the terms "comprises," "comprising," "includes," and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right," "left," "vertical," "horizontal," "top," "bottom," "upper," "lower," "under," "below," "underlying," "over," "overlying," "parallel," "perpendicular," etc., are intended to describe relative locations as they are oriented and illustrated in the drawings (unless otherwise indicated) and terms such as "touching," "in direct contact," "abutting," "directly adjacent to," "immediately adjacent to," etc., are intended to indicate that at least one element physically contacts another element (without other elements separating the described elements). The term "laterally" is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element. The corresponding structures, materials, acts, and equivalents of all means or step plus function elements in the claims below are intended to include any structure, material, or act for performing the function in combination with other claimed elements as specifically claimed.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various disclosed embodiments have been presented for purposes of illustration but are not intended to be exhaustive or limiting. Many modifications and variations will be apparent to those of ordinary skill in the art without departing from the scope and spirit of the disclosed embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
a first charge pump stage including first branches each connected between an input voltage node and ground, wherein the first branches each include first capacitors (C1, C2) connected between first intermediate nodes (Q1, Q1_B) and additional first intermediate nodes (V1, V1_B), respectively, and wherein the first charge pump stage further includes:
   two first p-channel field effect transistors connected in series between the additional first intermediate nodes (V1, V1_B), and
   two additional first p-channel field effect transistors connected in series between the first intermediate nodes (Q1, Q1_B),
   an additional first capacitor (C3) connected between the input voltage node and a first output voltage node at a junction between the additional first p-channel field effect transistors, wherein the first output voltage node outputs a first output voltage at a magnitude of approximately two times the input voltage; and
a second charge pump stage including second branches, wherein the second branches each include second capacitors each connected between second intermediate nodes and additional second intermediate nodes, respectively, and wherein the second charge pump stage has a second output voltage node that outputs a second output voltage at a magnitude of approximately three times the input voltage.

2. The structure of claim 1, wherein:
the first branches include first n-channel field effect transistors, the first capacitors, and additional first n-channel field effect transistors connected in series between the input voltage node and ground, respectively, the first intermediate nodes are between the first n-channel field effect transistors and the first capacitors, and the additional first intermediate nodes are between the first capacitors and the additional first n-channel field effect transistors.

3. The structure of claim 2, wherein the first n-channel field effect transistors are cross-coupled to each other and wherein the additional first n-channel field effect transistors are controlled by a clock signal and an inverted clock signal, respectively.

4. The structure of claim 3, wherein the input voltage node is connected to receive an input voltage (Vin), and wherein the clock signal switches between the input voltage and ground.

5. The structure of claim 1, wherein the first p-channel field effect transistors are controlled by the clock signal and the inverted clock signal, respectively; and the two additional first p-channel field effect transistors are cross coupled to each other.

6. The structure of claim 1, wherein the additional first capacitor is smaller than the first capacitors.

7. The structure of claim 1, wherein a supply voltage (VDD) is coupled to a load capacitor through the first charge pump stage and the second charge pump stage, and one of the first capacitors in the first charge pump stage and a second capacitor within the second charge pump stage are connected in series between the supply voltage and the load capacitor.

8. The structure of claim 1, wherein at least one first capacitor of the first charge pump stage and at least one second capacitor of the second charge pump stage each couple a supply voltage to ground in parallel.

9. A structure comprising:

a first charge pump stage including first branches each connected between an input voltage node and ground, wherein the first branches each include first capacitors (C1, C2) connected between first intermediate nodes (Q1, Q1_B) and additional first intermediate nodes (V1, V1_B), respectively, and wherein the first charge pump stage further includes:

two first p-channel field effect transistors connected in series between the additional first intermediate nodes (V1, V1_B), wherein the first p-channel field effect transistors are controlled by a clock signal and an inverted clock signal, respectively, and two additional first p-channel field effect transistors connected in series between the first intermediate nodes (Q1, Q1_B) and cross coupled to each other;

an additional first capacitor (C3) connected between an input voltage node and a first output voltage node at a junction between the additional first p-channel field effect transistors, wherein the first output voltage node outputs a first output voltage at a magnitude of approximately two times the input voltage; and a second charge pump stage including second branches, wherein the second branches each include second capacitors (C4, C5) connected between second intermediate nodes (Q2, Q2_B) and additional second intermediate nodes (V2, V2_B), respectively, and wherein the second charge pump stage has a second output voltage node that outputs a second output voltage at a magnitude of approximately three times the input voltage.

10. The structure of claim 9, wherein:

the first branches include first n-channel field effect transistors, the first capacitors, and additional first n-channel field effect transistors connected in series between the input voltage node and ground, the first intermediate nodes are between the first n-channel field effect transistors and the first capacitors, and the additional first intermediate nodes are between the first capacitors and the additional first n-channel field effect transistors.

11. The structure of claim 10, wherein the first n-channel field effect transistors are cross-coupled to each other and wherein the additional first n-channel field effect transistors are controlled by the clock signal and the inverted clock signal, respectively.

12. The structure of claim 11, wherein the input voltage node is connected to receive an input voltage (Vin), and wherein the clock signal switches between the input voltage and ground.

13. The structure of claim 9, wherein a supply voltage (VDD) is coupled to a load capacitor through the first charge pump stage and the second charge pump stage, and one of the first capacitors in the first charge pump stage and a second capacitor within the second charge pump stage are connected in series between the supply voltage and the load capacitor.

14. The structure of claim 13, wherein at least one first capacitor of the first charge pump stage and at least one second capacitor of the second charge pump stage each couple the supply voltage to ground in parallel.

15. A method comprising:

applying an input voltage to a first charge pump stage including first branches each connected between an input terminal and ground, wherein the first branches each include first capacitors (C1, C2) connected between first intermediate nodes (Q1, Q1_B) and additional first intermediate nodes (V1, V1_B), respectively, and the first charge pump further includes two first p-channel field effect transistors connected in series between the additional first intermediate nodes (V1, V1_B) and two additional first p-channel field effect transistors connected in series between the first intermediate nodes (Q1, Q1_B);

connecting an additional first capacitor (C3) between an input voltage node and a first output voltage node at a junction between the additional first p-channel field effect transistors, wherein applying the input voltage causes the first charge pump stage to output a first output voltage at a magnitude of approximately two times the input voltage; and outputting a voltage from the first charge pump stage to a second charge pump stage including second branches each connected between second intermediate nodes (Q2, Q2_B) and additional second intermediate nodes (V2, V2_B), respectively, wherein the second branches include second capacitors (C4, C5) connected between second intermediate nodes (Q2, Q2_B) and additional second intermediate nodes (V2, V2_B), and wherein the second charge pump stage outputs a second output voltage at a magnitude of approximately three times the input voltage.

16. The method of claim 15, further comprising:

coupling a supply voltage coupled to a load capacitor through the first charge pump stage and the second charge pump stage, wherein one of the first capacitors in the first charge pump stage and a second capacitor within the second charge pump stage are connected in series between the supply voltage and the load capacitor, and wherein another first capacitor of the first charge pump stage and another second capacitor of the second charge pump stage each couple the supply voltage to ground in parallel.

17. The method of claim 15, further comprising:

connecting in series in the first branch, a first n-channel field effect transistor, the first capacitors and an additional first n-channel field effect transistor in between an input voltage node and ground.

18. The method of claim 17, further comprising:

cross-coupling the first n-channel field transistors and controlling the additional first n-channel field effect transistors by a clock signal and an inverted clock signal, respectively.

* * * * *